(12) United States Patent
Imamura et al.

(10) Patent No.: US 9,261,528 B2
(45) Date of Patent: Feb. 16, 2016

(54) IMPACT DETECTING DEVICE

(71) Applicants: DENSO CORPORATION, Kariya, Aichi-pref. (JP); Toyota Jidosha Kabushiki Kaisha, Toyota-shi, Aichi-ken (JP)

(72) Inventors: Yasuo Imamura, Kariya (JP); Tateki Takayama, Toyota (JP); Yasuki Otake, Toyota (JP); Tomoaki Nakashima, Toyota (JP); Norihiko Nagae, Toyota (JP); Tsutomu Kondo, Toyota (JP); Yujiro Miyata, Kasugai (JP)

(73) Assignees: DENSO CORPORATION, Kariya, Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/222,956

(22) Filed: Mar. 24, 2014

(65) Prior Publication Data
US 2014/0285333 A1 Sep. 25, 2014

(30) Foreign Application Priority Data

Mar. 25, 2013 (JP) ................. 2013-062213
Dec. 24, 2013 (JP) ................. 2013-265721

(51) Int. Cl.
*B60Q 1/00* (2006.01)
*G01P 15/08* (2006.01)
*B60L 11/18* (2006.01)

(52) U.S. Cl.
CPC ......... *G01P 15/0891* (2013.01); *B60L 11/1851* (2013.01)

(58) Field of Classification Search
CPC ............................. G08G 1/205; B60R 21/013
USPC ................... 340/436, 438; 320/112, 130, 134
See application file for complete search history.

(56) References Cited

U.S. PATENT DOCUMENTS

| 7,928,696 | B2 * | 4/2011 | Odaohhara et al. | ........... 320/134 |
| 2002/0113421 | A1 * | 8/2002 | Haeuslmeier et al. | ........ 280/741 |
| 2004/0160045 | A1 * | 8/2004 | Miura | ........................... 280/735 |
| 2005/0049835 | A1 | 3/2005 | Mayer et al. | |
| 2009/0289781 | A1 | 11/2009 | Yamada et al. | |
| 2010/0044126 | A1 * | 2/2010 | Ohno | ........................... 180/65.1 |
| 2012/0309588 | A1 * | 12/2012 | Ashida et al. | ...................... 477/7 |
| 2013/0119898 | A1 * | 5/2013 | Ohkura | ........................ 318/139 |

FOREIGN PATENT DOCUMENTS

| JP | 2001-189161 | 7/2001 |
| JP | 2005-140688 | 6/2005 |
| JP | 2009-187830 | 8/2009 |
| JP | 2010-006598 | 1/2010 |
| JP | 4962863 | 4/2012 |

* cited by examiner

*Primary Examiner* — Tai T Nguyen
(74) *Attorney, Agent, or Firm* — Harness, Dickey & Pierce, P.L.C.

(57) ABSTRACT

An impact detecting device includes a first impact detecting portion, a determining portion and an informing portion. The first impact detecting portion detects an impact applied to an object equipped to a vehicle. The determining portion determines that the object has received the impact when a detection result of the first impact detecting portion is greater than a first impact determination threshold. The informing portion informs that the object has received the impact, when the determining portion determines that the object has received the impact.

10 Claims, 9 Drawing Sheets

IMPACT DETECTING DEVICE

CROSS REFERENCE TO RELATED APPLICATION

This application is based on Japanese Patent Applications No. 2013-62213 filed on Mar. 25, 2013 and No. 2013-265721 filed on Dec. 24, 2013, the disclosures of which are incorporated herein by reference.

TECHNICAL FIELD

The present disclosure relates to an impact detecting device that detects an impact applied to an object equipped to a vehicle.

BACKGROUND

As an example of an impact detecting device for detecting an impact applied to an object equipped to a vehicle, a publication of Japanese Patent No. 4962863 (JP 4962862 B2) discloses an impact recording body for a fuel tank.

The impact recording body is made of austenite steel that creates phase transformation upon reception of an impact. The impact recording body covers a fuel tank. When an impact is applied to the fuel tank, the phase transformation of the austenite steel occurs in the impact recording body, and martensite is generated by the phase transformation of the austenite steel. The magnitude of the impact is detected by measuring the quantity of the martensite using a permeameter. Therefore, it is possible to determine whether the fuel tank has received an impact which causes damage to the fuel tank, based on the quantity of the martensite.

In the method where the impact applied to the fuel tank is detected using the impact recording body, it is necessary to measure the quantity of martensite using the permeameter. Therefore, it is difficult to immediately know whether the fuel tank has received the impact. Further, even if the fuel tank has received an impact that causes damage to the fuel tank, a user will not know such damage until a periodic inspection.

SUMMARY

It is an object of the present disclosure to provide an impact detecting device that can immediately inform a user that an object equipped to a vehicle has received an impact to a user.

According to an aspect of the present disclosure, an impact detecting device includes a first impact detecting portion, a determining portion and an informing portion. The first impact detecting portion detects an impact applied to an object equipped to a vehicle. The determining portion determines that the object has received an impact when a detection result of the first impact detecting portion is greater than a first impact determination threshold. The informing portion informs a user that the object has received the impact, when the determining portion determines that the object has received the impact.

In this structure, the impact detecting device can immediately inform a user that the object has received the impact.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Exemplary embodiments of the present disclosure will be described.

First Embodiment

A structure of an impact detecting device according to a first embodiment will be described with reference to FIG. 1.

The impact detecting device detects an impact applied to an object equipped to a vehicle, and informs a detection result to a user, such as a passenger of the vehicle.

Figure 1:
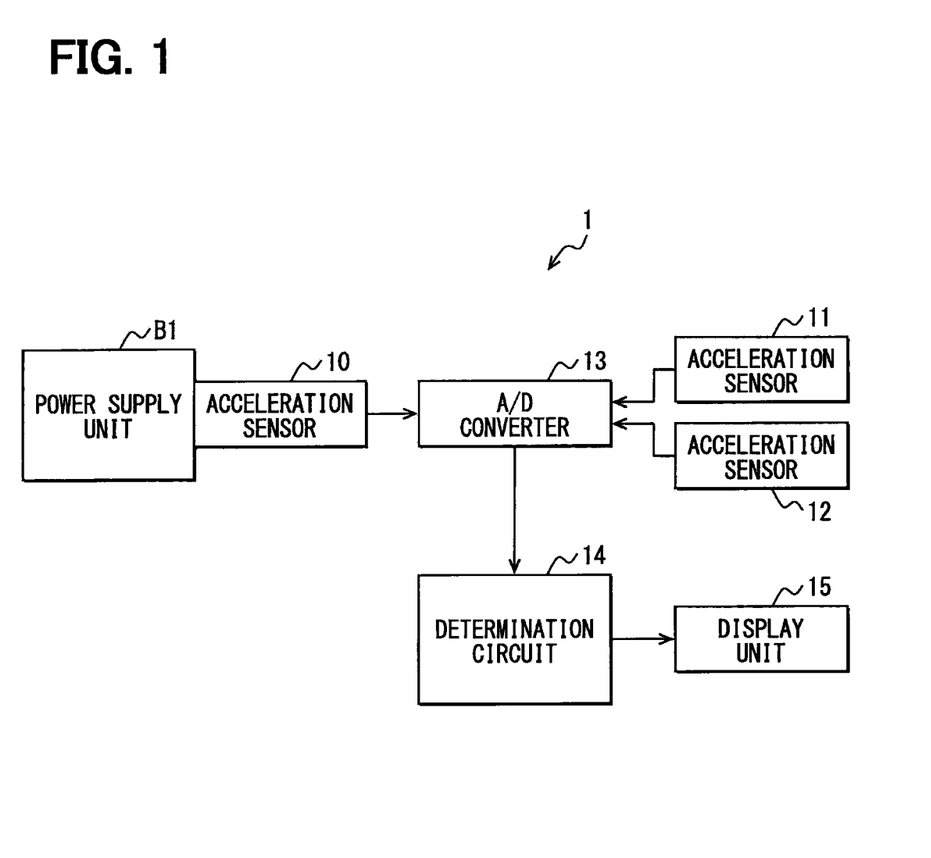
FIG. 1 is a circuit diagram of an impact detecting device according to a first embodiment of the present disclosure.

Referring to FIG. 1, an impact detecting device 1 detects an impact applied to a power supply unit B1 equipped to an electric vehicle, and informs a detection result to a user of the vehicle. In this case, the power supply unit B1 corresponds to the object equipped to the vehicle. The power supply unit B1 is a direct current source that supplies electric power to a driving device, which drives a motor for traveling the vehicle.

The impact detecting device 1 includes acceleration sensors 10, 11, 12, an A/D converter 13, a determination circuit 14, and a display unit 15. The acceleration sensor 10 corresponds to a first impact detecting portion. The acceleration sensor 11 and the acceleration sensor 12 correspond to a second impact detecting portion. The determination circuit 14 corresponds to a determining portion. The display unit 15 corresponds to an informing portion.

The acceleration sensor 10 detects an impact applied to the power supply unit B1, and outputs an analog signal according to a detection result to the A/D converter 13. In particular, the acceleration sensor 10 is a sensor that detects an acceleration applied to the power supply unit B1. The acceleration sensor 10 is fixed to the power supply unit B1, and is connected to the A/D converter 13.

The acceleration sensors 11, 12 detect an impact applied to the vehicle, and output analog signals according to the detection results to the A/D converter 13. In particular, the acceleration sensors 11, 12 are sensors that detect an acceleration applied to the vehicle. The acceleration sensors 11, 12 are disposed at predetermined positions of the vehicle, respectively, and are connected to the A/D converter 13.

The A/D converter 13 is an element that converts the analog signal outputted from each of the acceleration sensors 10-12 into digital data and provides the digital data to the determination circuit 14. Input terminals of the A/D converter 13 are connected to the acceleration sensors 10-12. An output terminal of the A/D converter 13 is connected to the determination circuit 14.

The determination circuit 14 determines whether the power supply unit B1 has received an impact based on the detection results of the acceleration sensors 10-12, and outputs an alarm signal to the display unit 15 for indicating that the power supply unit B1 has received the impact, as necessary. The determination circuit 14 has a microcomputer. The input terminal of the determination circuit 14 is connected to the output terminal of the A/D converter 13, and the output terminal of the determination circuit 14 is connected to the display unit 15.

The display unit 15 is an element to indicate that the power supply unit B1 has received an impact, based on the alarm signal outputted from the determination circuit 14, thereby to inform a user that the power supply unit B1 has received the impact. The input terminal of the display unit 15 is connected to the output terminal of the determination circuit 14.

The vehicle is provided with an occupant protection device control unit that actuates an occupant protection device based on an impact applied to the vehicle for protecting an occupant. The occupant protection device control unit includes an impact detecting sensor and a control circuit. For example, the occupant protection device is an air bag, and the occupant protection device control unit is an airbag control unit. The airbag control unit includes an acceleration sensor as the impact detecting sensor and the control circuit. The acceleration sensor detects an impact applied to the vehicle. The control circuit controls an operation of the airbag based on a detection result of the acceleration sensor.

The acceleration sensors 11, 12 are provided by the acceleration sensor of the occupant protection device control unit, such as the airbag control unit. The determination circuit 14 is provided by the control circuit of the occupant protection device control unit. The impact detecting device 1 is configured using the acceleration sensor and the control circuit of the airbag control unit.

Next, an operation of the impact detecting device according to the first embodiment will be described with reference to FIGS. 1 to 6.

As shown in FIG. 1, the acceleration sensor 10 detects an impact applied to the power supply unit B1, and outputs an analog signal indicating a detection result to the A/D converter 13. The acceleration sensors 11, 12 detect an impact applied to the vehicle, and output analog signals indicating detection results to the A/D converter 13. The A/D converter 13 converts the analog signal outputted from each of the acceleration sensors 10-12 into digital data, and outputs the digital data to the determination circuit 14.

Figure 2:
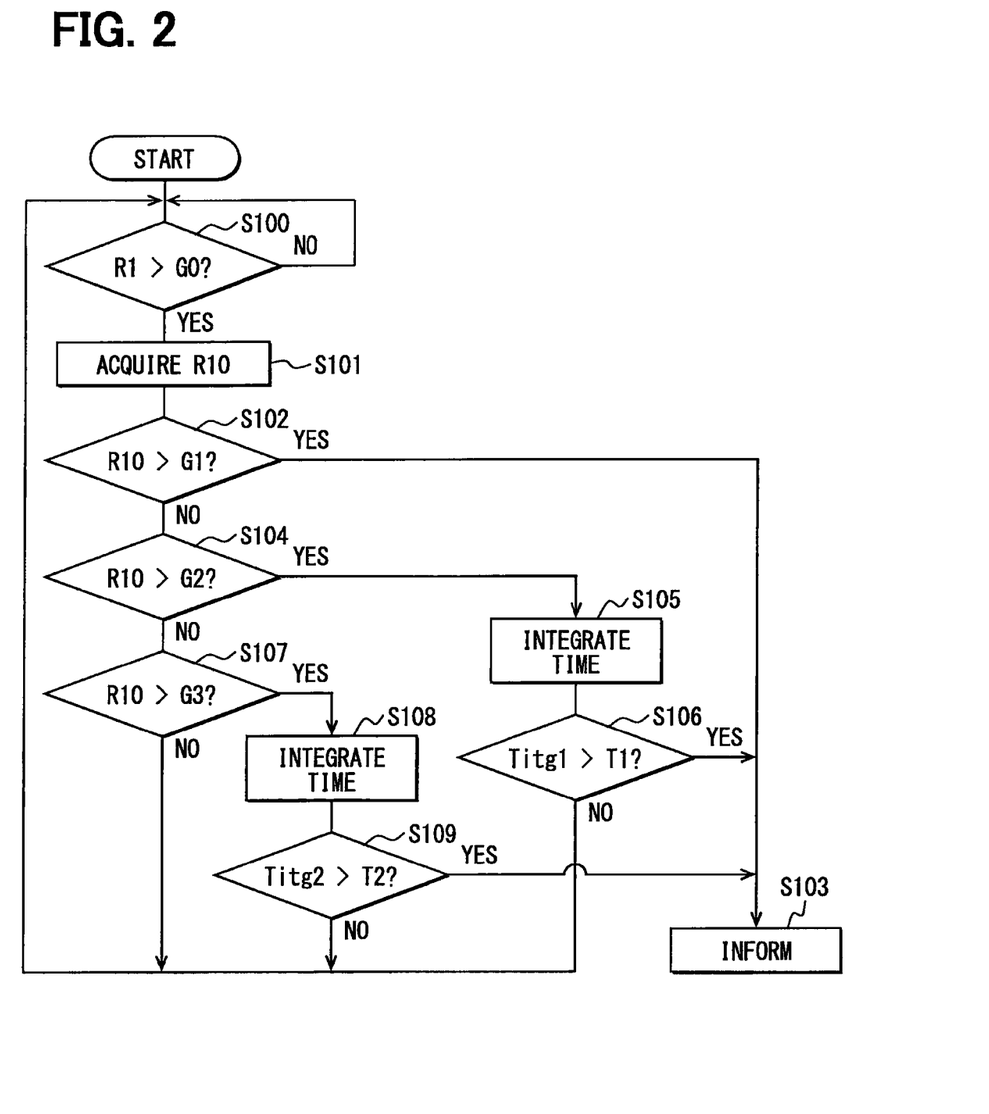
FIG. 2 is a flowchart illustrating an operation of the impact detecting device shown in FIG. 1.
Figure 3:
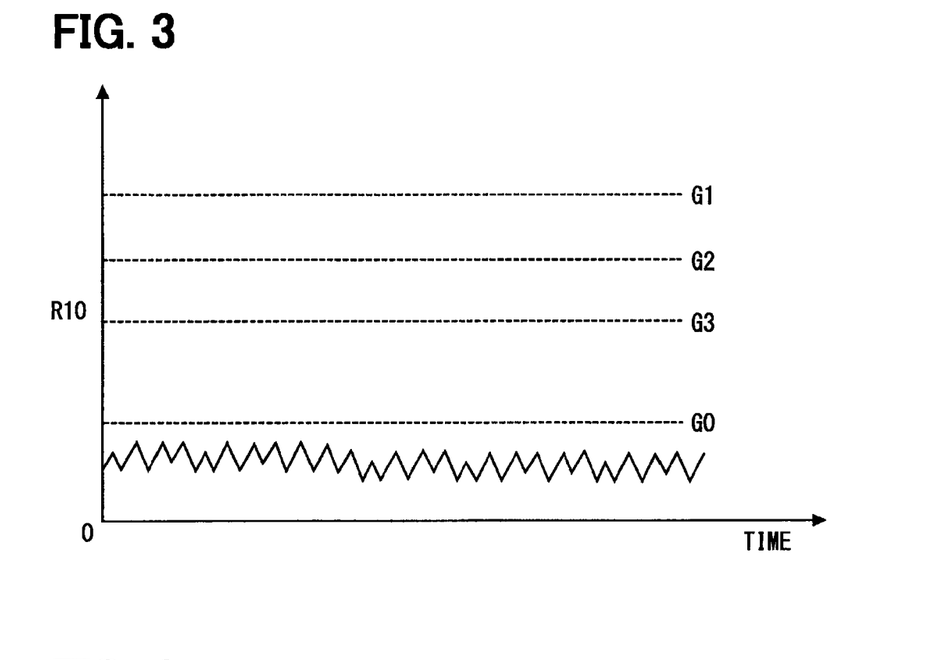
FIG. 3 is a first waveform chart for explaining the operation of the impact detecting device according to the first embodiment.

As shown in FIG. 2, at S100, the determination circuit 14 determines whether a detection result R1 of the acceleration sensors 11, 12 is greater than an acceleration determination threshold G0 (fourth impact determination threshold).

When the determination circuit 14 determines that the detection result R1 of the acceleration sensors 11, 12 is not greater than the acceleration determination threshold G0 (S100: NO), the determination circuit 14 repeats the determination of S100. That is, when the detection result R1 of the acceleration sensors 11, 12 is not greater than the acceleration determination threshold G0, the determination circuit 14 does not perform determination of whether the power supply unit B1 has received an impact. In this case, the acceleration determination threshold G0 is set to a value greater than a maximum acceleration that the vehicle may normally receives. Also, the acceleration determination threshold G0 is set to the value lower than acceleration determination thresholds G1-G3, which are used as references for determination of whether the power supply unit B1 has received an impact.

When the determination circuit 14 determines that the detection result R1 of the acceleration sensors 11, 12 is greater than the acceleration determination threshold G0 (S100: YES), the determination circuit 14 acquires the detection result R10 of the acceleration sensor 10 outputted from the A/D converter 13, for determining whether the power supply unit B1 has received an impact, at S101. The determination circuit 14 determines whether the detection result R10 of the acceleration sensor 10 is greater than an acceleration determination threshold G1 (first determination threshold) at S102. In this case, the acceleration determination threshold G1 is set to an acceleration value that may cause damage to the power supply unit B1 even if applied to the power supply unit B1 only once.

Figure 4:
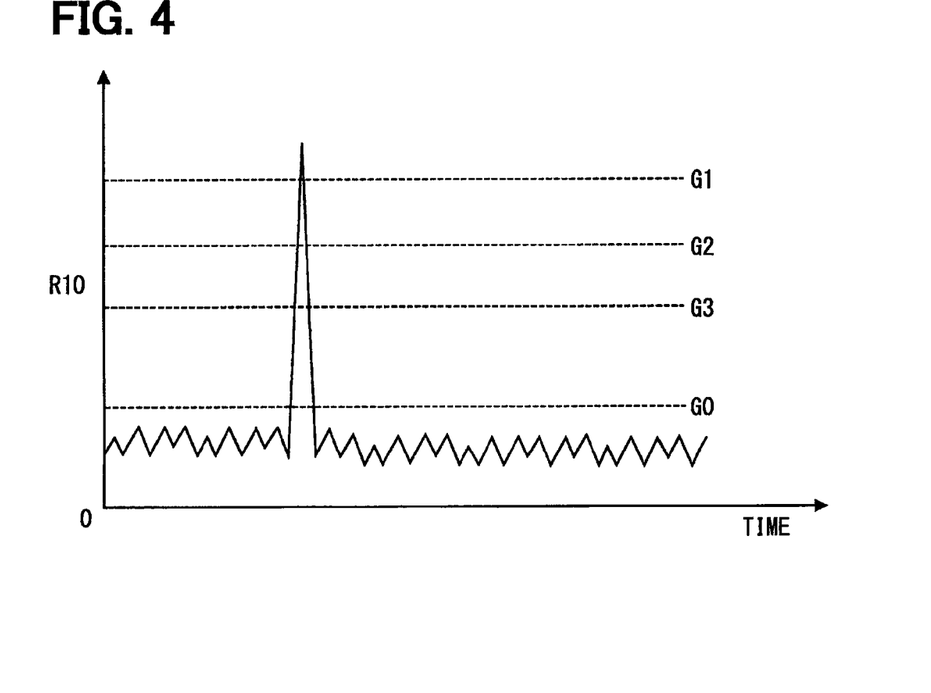
FIG. 4 is a second waveform chart for explaining the operation of the impact detecting device according to the first embodiment.

When the determination circuit 14 determines that the detection result R10 of the acceleration sensor 10 is greater than the acceleration determination threshold G1 as shown in FIG. 4 (S102: YES), the determination circuit 14 provides the alarm signal to the display unit 15. The display unit 15 indicates that the power supply unit B1 has received an impact to inform that to the user at S103.

When the determination circuit 14 determines that the detection result R10 of the acceleration sensor 10 is not greater than the acceleration determination threshold G1 (S102: NO), the determination circuit 14 determines whether the detection result R10 of the acceleration sensor 10 is greater than an acceleration determination threshold G2 (second impact determination threshold) at S104. The acceleration determination threshold G2 is set to an acceleration value that is lower than the acceleration determination threshold G1, and may cause damage to the power supply unit B1 if the power supply unit B1 is subjected to such an acceleration repeatedly or for a long time, though it may not cause damage to the power supply unit B1 if applied only once.

Figure 5:
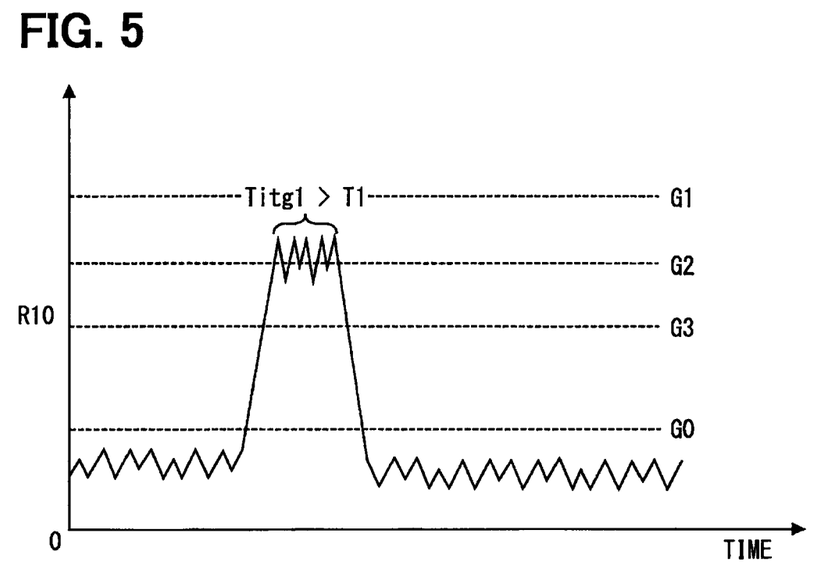
FIG. 5 is a third waveform chart for explaining the operation of the impact detecting device according to the first embodiment.

When the determination circuit 14 determines that the detection result R10 of the acceleration sensor 10 is greater than the acceleration determination threshold G2 (S104: YES), the determination circuit 14 integrates the time that the detection result R10 exceeds the acceleration determination threshold G2, as shown in FIG. 5, at S105. The determination circuit 14 determines whether an integrated time Titg1 that the detection result R10 exceeds the acceleration determination threshold G2 is greater than an integrated time determination threshold T1 (first integrated time determination threshold) at S106. The integrated time determination threshold T1 is set to a level (integrated time value) at which the power supply unit B1 may be damaged if being applied with the acceleration exceeding the acceleration determination threshold G2 for a long time or repeatedly.

When the determination circuit 14 determines that the integrated time Titg1 is greater than the integrated time determination threshold T1, as shown in FIG. 5 (S106: YES), the determination circuit 14 outputs the alarm signal. The display unit 15 indicates that the power supply unit B1 has received the impact so as to inform it to the user at S103.

When the determination circuit 14 determines that the detection result R10 of the acceleration sensor 10 is not greater than the acceleration determination threshold G2 (S104: NO), the determination circuit 14 determines whether the detection result R10 of the acceleration sensor 10 is greater than an acceleration determination threshold G3 (third impact determination threshold) at S107. In this case, the acceleration determination threshold G3 is set to a level (acceleration) that is lower than the acceleration determination threshold G2, and that may cause damage to the power supply unit B1 when applied for a long time or repeatedly, though it may not cause damage to the power supply unit B1 if applied only once.

Figure 6:
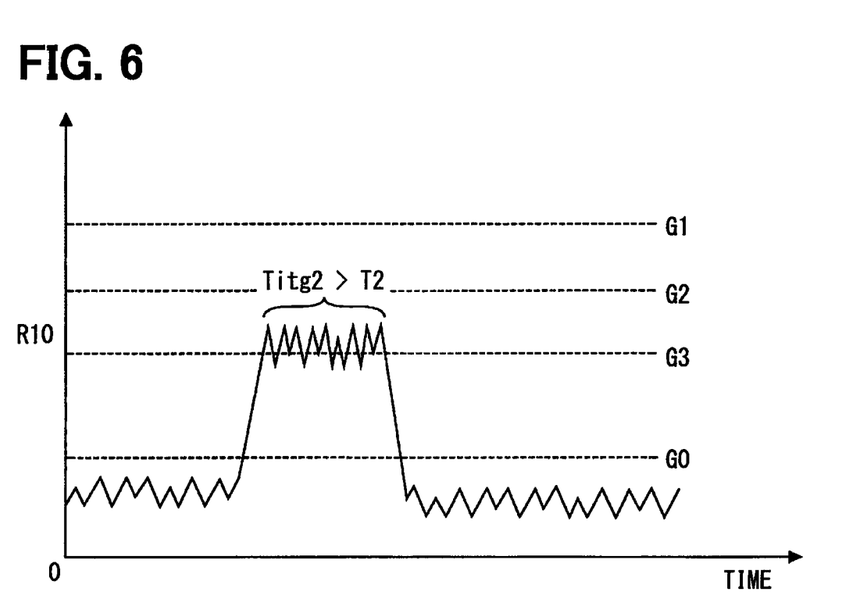
FIG. 6 is a fourth waveform chart for explaining the operation of the impact detecting device according to the first embodiment.

When the determination circuit 14 determines that the detection result R10 of the acceleration sensor 10 is greater than the acceleration determination threshold G3 (S107: YES), the determination circuit 14 integrates the time that the detection result R10 exceeds the acceleration determination threshold G3, as shown in FIG. 6, at S108. The determination circuit 14 determines whether the integrated time Titg2 that the detection result R10 exceeds the acceleration determination threshold G3 is greater than an integrated time determination threshold T2 (second integrated time determination threshold) at S109. The integrated time determination threshold T2 is set to a level (integrated time value) that is greater than the integrated time determination threshold T1, and at which the power supply unit B1 may be damaged if being applied with the acceleration exceeding the acceleration determination threshold G3 for a long time or repeatedly.

When the determination circuit 14 determines that the integrated time Titg2 is greater than the integrated time determination threshold T2 (S109: YES), the determination circuit 14 outputs the alarm signal to the display unit 15. The display unit 15 indicates that the power supply unit B1 has received the impact so as to inform it to the user at S103.

When the determination circuit 14 determines that the integrated time Titg1 is not greater than the integrated time determination threshold T1 (S106: NO), the determination circuit 14 returns to S100. When the determination circuit 14 determines that the integrated time Titg2 is not greater than the integrated time determination threshold T2 (S109: NO), the determination circuit 14 returns to S100. When the determination circuit 14 determines that the detection result R10 of the acceleration sensor 10 is not greater than the acceleration determination threshold G3 (S107: NO), the determination circuit 14 returns to S100.

Next, advantageous effects of the impact detecting device 1 of the first embodiment will be described.

In the first embodiment, the impact detecting device 1 includes the acceleration sensor 10, the determination circuit 14 and the display unit 15. The acceleration sensor 10 detects an impact applied to the power supply unit B1 of the vehicle. The determination circuit 14 determines that the power supply unit B1 has received an impact when the detection result R10 of the acceleration sensor 10 is greater than the acceleration determination threshold G1. When the determination circuit 14 determines that the power supply unit B1 has received the impact, the display unit 15 informs a user of the vehicle that the power supply unit B1 has received the impact. In this case, therefore, the impact detecting device 1 can immediately inform the user that the power supply unit B1 has received the impact. Accordingly, it is possible to reduce a situation where the user does not recognize that the power supply unit B1 has received the impact until a periodic inspection, even if the power supply unit B1 has received an impact that causes damage to the power supply unit B1.

Even if an impact applied to the power supply unit B1 is equal to or lower than the acceleration determination threshold G1, the power supply unit B1 may be damaged if being subjected to such an impact for a long time or repeatedly. In the first embodiment, the determination circuit 14 determines that the power supply unit B1 has received an impact, when the detection result R10 of the acceleration sensor 10 is equal to or smaller than the acceleration determination threshold G1 and the integrated time Titg1 exceeds the integrated time determination threshold T1. Therefore, a situation that causes damage to the power supply unit B1 can be properly determined.

Even if an impact applied to the power supply unit B1 is equal to or lower than the acceleration determination threshold G2, the power supply unit B1 may be damaged if being subjected to such an impact for a long time or repeatedly. In the first embodiment, the determination circuit 14 determines that the power supply unit B1 has received an impact when the detection result R10 of the acceleration sensor 10 is equal to or lower than the acceleration determination threshold value G2 and the integrated time Titg2 exceeds the integrated time determination threshold T2. Therefore, a situation that causes damage to the power supply unit B1 can be properly determined.

If the detection result R10 of the acceleration sensor 10 is overlapped with noise, the determination circuit 14 may make an erroneous determination. In the first embodiment, on the other hand, the impact detecting device 1 has the acceleration sensors 11, 12 that detect an impact applied to the vehicle. The determination circuit 14 does not perform determination when the detection result R1 of the acceleration sensors 11, 12 is equal to or lower than the acceleration determination threshold G0, which is lower than the acceleration determination threshold G3. That is, the determination circuit 14 performs the determination of whether the power supply unit B1 has received an impact, when the detection result R1 of the acceleration sensors 11, 12 is greater than the acceleration determination threshold G0. Therefore, erroneous determination due to the overlapping of the noise can be reduced.

The vehicle is provided with the airbag control unit that actuates an airbag to protect an occupant based on the impact applied to the vehicle. The airbag control unit includes the acceleration sensors and the control circuit. The acceleration sensor detects an impact applied to the vehicle. The control circuit controls an operation of the airbag based on the detection result of the acceleration sensor. In the first embodiment, the acceleration sensors 11, 12 are provided by the acceleration sensors of the airbag control unit. Also, the determination circuit 14 is provided by the control circuit of the airbag control unit. The impact detecting device 1 is constructed by using the acceleration sensors and the control circuit of the airbag control unit. Therefore, the structure can be simplified, and costs can be reduced.

Second Embodiment

Next, an impact detecting device according to a second embodiment will be described.

In the impact detecting device of the second embodiment, the determination of whether the power supply unit B1 has received an impact is performed based on the number of times that an impact is applied to the power supply unit B1, in place of the determination based on the integrated time of the first embodiment. The basic structure of the impact detecting device of the second embodiment is the same as the impact detecting device 1 of the first embodiment, and thus the description thereof will not be repeated.

Figure 7:
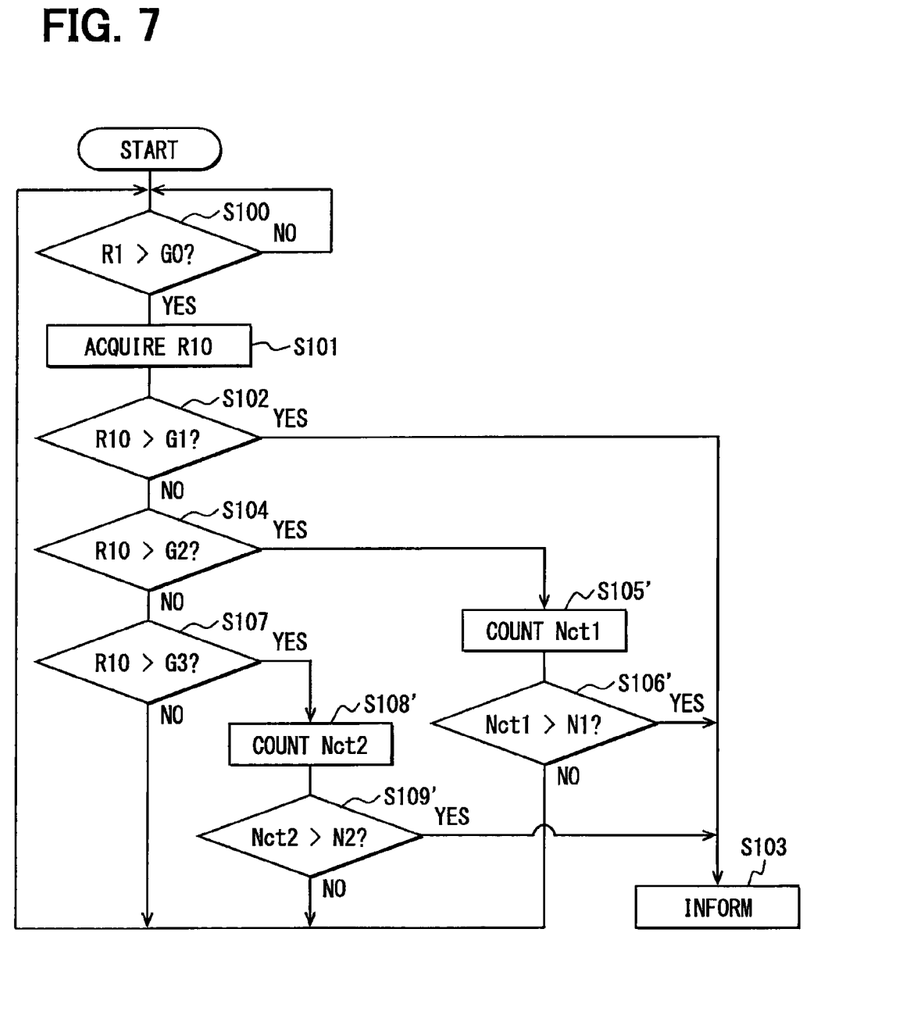
FIG. 7 is a flowchart illustrating an operation of an impact detecting device according to a second embodiment of the present disclosure.

Referring to FIG. 1 and FIG. 7, an operation of the impact detecting device of the second embodiment will be described. In the operation, S100 to S104, and S107 are substantially the same as those of the first embodiment shown in FIG. 2, and thus the description thereof will be made only when needed. Hereinafter, the description will be mainly made in regard to S105', S106', S108' and S109', which are different from the impact detecting device 1 of the first embodiment.

When the determination circuit 14 determines that the detection result R10 of the acceleration sensor 10 is greater than the acceleration determination threshold G2 (S104: YES), the determination circuit 14 counts up the number of times Nct1 that the detection result R10 exceeds the acceleration determination threshold G2 at S105'. The determination circuit 14 determines whether the number of times Nct1 is greater than a number determination threshold N1 (first number determination threshold) at S106'. In this case, the number determination threshold N1 is set to a level (number of times) at which the power supply unit B1 may be damaged if applied with an acceleration exceeding the acceleration determination threshold G2 repeatedly.

Figure 8:
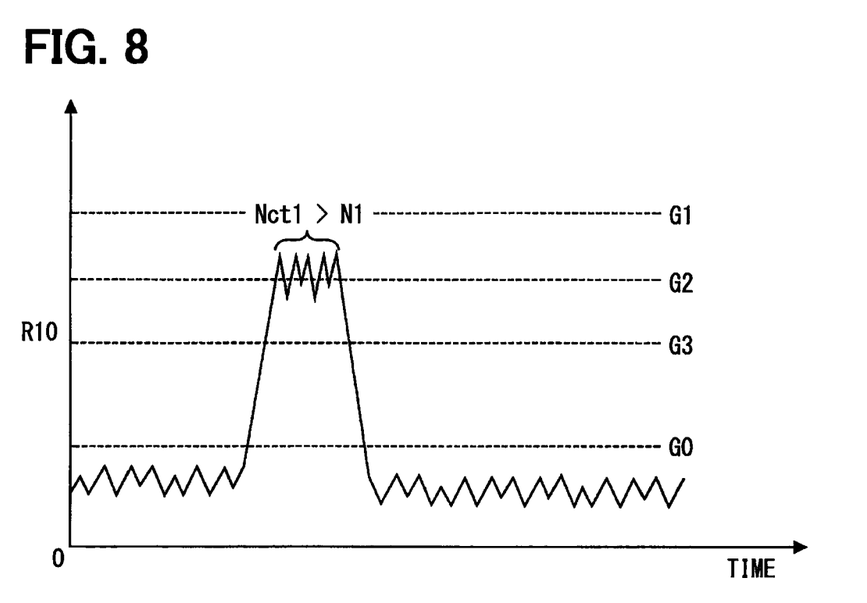
FIG. 8 is a first waveform chart for explaining the operation of the impact detecting device according to the second embodiment.

When the determination circuit 14 determines that the number of times Nct1 is greater than the number determination threshold N1, as shown in FIG. 8 (S106': YES), the determination circuit 14 outputs the alarm signal. The display unit 15 indicates that the power supply unit B1 has received an impact to inform it to the user at S103.

Figure 9:
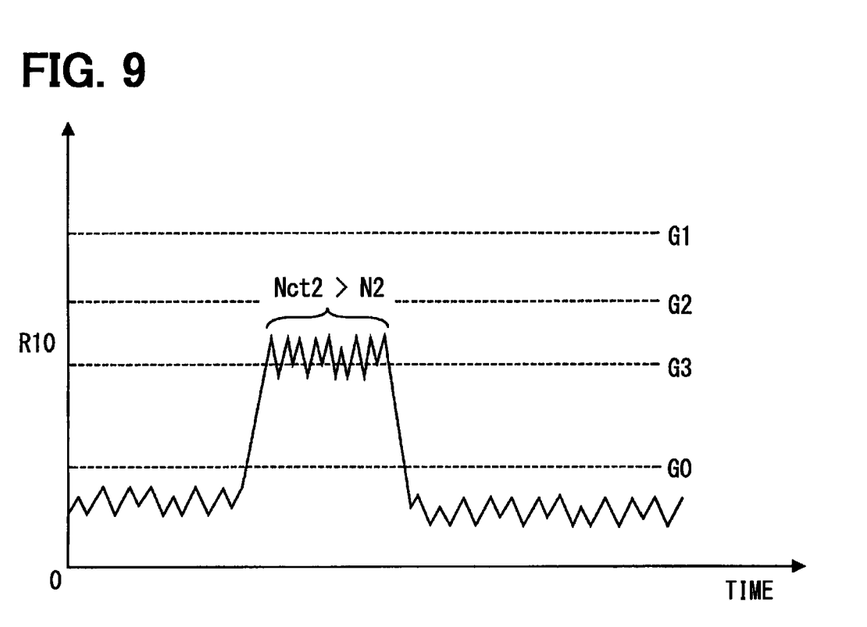
FIG. 9 is a second waveform chart for explaining the operation of the impact detecting device according to the second embodiment.

When the determination circuit 14 determines that the detection result R10 of the acceleration sensor 10 is greater than the acceleration determination threshold G3 at S107, the determination circuit 14 counts up the number of times Nct2 that the detection result R10 exceeds the acceleration determination threshold G3, as shown in FIG. 9, at S108'. The determination circuit 14 determines whether the number of times Nct2 is greater than a number determination threshold N2 (second number determination threshold) at S109'. In this case, the number determination threshold N2 is set to a level (number of times) that is greater than the number determination threshold N1 and at which the power supply unit B1 may be damaged if being applied with an acceleration exceeding the acceleration determination threshold G3 repeatedly.

When the determination circuit 14 determines that the number of times Nct2 is greater than the number determination threshold N2 as shown in FIG. 9 (S109': YES), the determination circuit 14 outputs the alarm signal. The display unit 15 indicates that the power supply unit B1 has received the impact to inform it to the user at S103.

When the determination circuit 14 determines that the number of times Nct1 that the detection result R10 exceeds the acceleration determination threshold G2 is not greater than the number determination threshold N1 (S106': NO), the determination circuit 14 returns to S100. When the determination circuit 14 determines that the number of times Nct2 that the detection result R10 exceeds the acceleration determination threshold G3 is not greater than the number determination threshold N2 (S109': NO), the determination circuit 14 returns to S100. When the determination circuit 14 determines that the detection result R10 of the acceleration sensor 10 is not greater than the acceleration determination threshold G3 (S107: NO), the determination circuit 14 returns to S100.

Next, advantageous effects of the impact detecting device of the second embodiment will be described.

Even if an impact applied to the power supply unit B1 is equal to or lower than the acceleration determination threshold G1, the power supply unit B1 may be damaged if being subjected to such an impact repeatedly. In the second embodiment, the determination circuit 14 determines that the power supply unit B1 has received an impact when the detection result R10 is equal to or lower than the acceleration determination threshold G1 and the number of times Nct1 that the detection result R10 exceeds the acceleration determination threshold G2 being smaller than the acceleration determination threshold G1 is greater than the number determination threshold N1. Therefore, a situation that may cause damage to the power supply unit B1 can be properly determined.

Even if an impact applied to the power supply unit B1 is equal to or smaller than the acceleration determination threshold G2, the power supply unit B1 may be damaged if being subjected to such an impact repeatedly. In the second embodiment, the determination circuit 14 determines that the power supply unit B1 has received an impact when the detection result R10 of the acceleration sensor 10 is equal to or lower than the acceleration determination threshold G2 and the number of times Nct1 that the detection result R10 exceeds the acceleration determination threshold G3 being smaller than the acceleration determination threshold G2 is greater than the number determination threshold N2. Therefore, a situation that may cause damage to the power supply unit B1 can be properly determined.

Third Embodiment

An impact detecting device according to a third embodiment will be described.

The impact detecting device of the third embodiment has a storing circuit, in addition to the structure of the first embodiment. In this structure, when the integrated time exceeds the integrated time determination threshold, the integrated time is stored in the storing circuit, without being informed to the user.

A structure of the impact detecting device of the third embodiment will be described with reference to FIG. 10.

Figure 10:
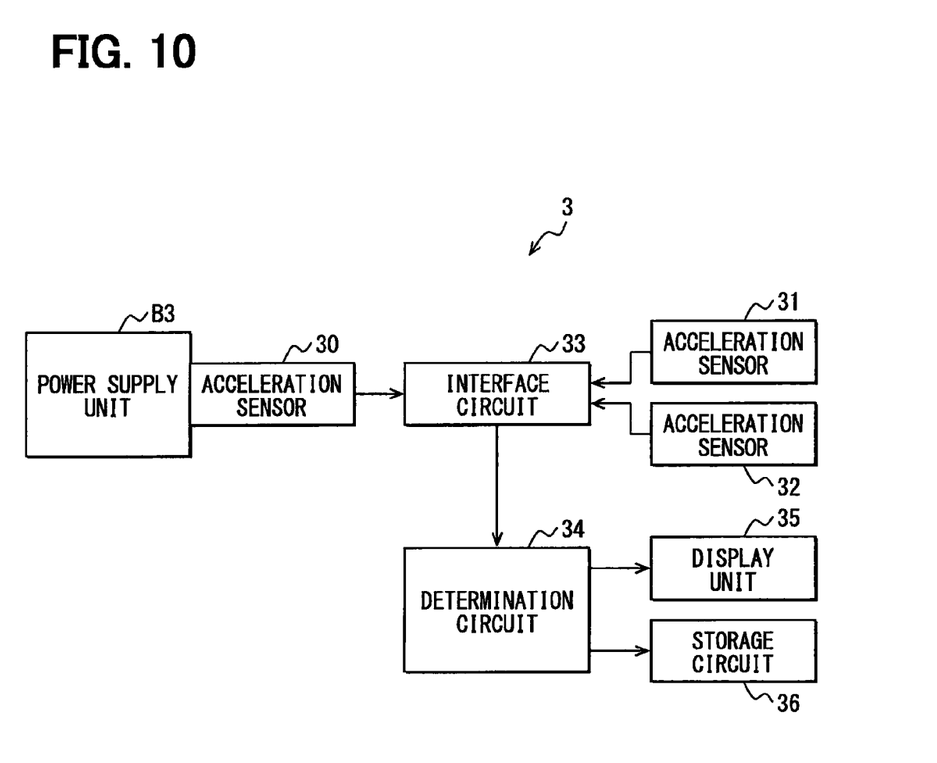
FIG. 10 is a circuit diagram of an impact detecting device according to a third embodiment of the present disclosure.

As shown in FIG. 10, an impact detecting device 3 detects an impact applied to a power supply unit B3 (object) equipped to an electric vehicle, and informs the detection result to a user of the vehicle. Also, when an impact applied to the power supply unit B3 satisfies a predetermined condition, the impact detecting device 3 stores information regarding contents of processing. In this case, the power supply unit B3 has the same structure as the power supply unit B1 of the first embodiment.

The impact detecting device 3 includes an acceleration sensor 30, acceleration sensors 31, 32, an interface circuit 33, a determination circuit 34, a display unit 35 and a storage circuit 36. The acceleration sensor 30 corresponds to a first impact detecting portion. The acceleration sensors 31, 32 correspond to a second impact detecting portion. The determination circuit 34 corresponds to a determining portion. The display unit 35 corresponds to an informing portion. The storage circuit 36 corresponds to a storing portion.

The acceleration sensors 30-32 correspond to the acceleration sensors 10-12 of the first embodiment. The acceleration sensors 30-32 outputs analog signals according to detection results to the interface circuit 33, or transmit digital signals according to the detection results to the interface circuit 33.

The interface circuit 33 is employed in place of the A/D converter 13 of the first embodiment. The interface circuit 33 converts the signals provided from the acceleration sensors 30-32, respectively, into digital data, and outputs the digital data to the determination circuit 34. In the case where the acceleration sensors 30-32 output analog signals indicating the detection results, the interface circuit 33 converts the analog signals into digital data, and outputs the digital data to the determination circuit 34. In the case where the acceleration sensors 30-32 transmit digital signals indicating the detection results, the interface circuit 33 receives the digital signals, converts the digital signals into digital data, and outputs the digital data to the determination circuit 34.

The determination circuit 34 determines whether the power supply unit B3 has received an impact based on the detection results of the acceleration sensors 30-32, and outputs an alarm signal to the display unit 35 for displaying that the power supply unit B3 has received the impact, when needed. Also, the determination circuit 34 outputs information regarding the contents of processing to the storage circuit 36, when needed. The determination circuit 34 includes a microcomputer. The input terminal of the determination circuit 34 is connected to the output terminal of the interface circuit 33. The output terminals of the determination circuit 34 are connected to the display unit 35 and the storage circuit 36.

The display unit 35 has the same structure and the same function as those of the display unit 15 of the first embodiment.

The storage circuit 36 stores information regarding the result of processing of the determination circuit 34 outputted from the determination circuit 34. The input terminal of the storage circuit 36 is connected to the output terminal of the determination circuit 34.

Figure 11:
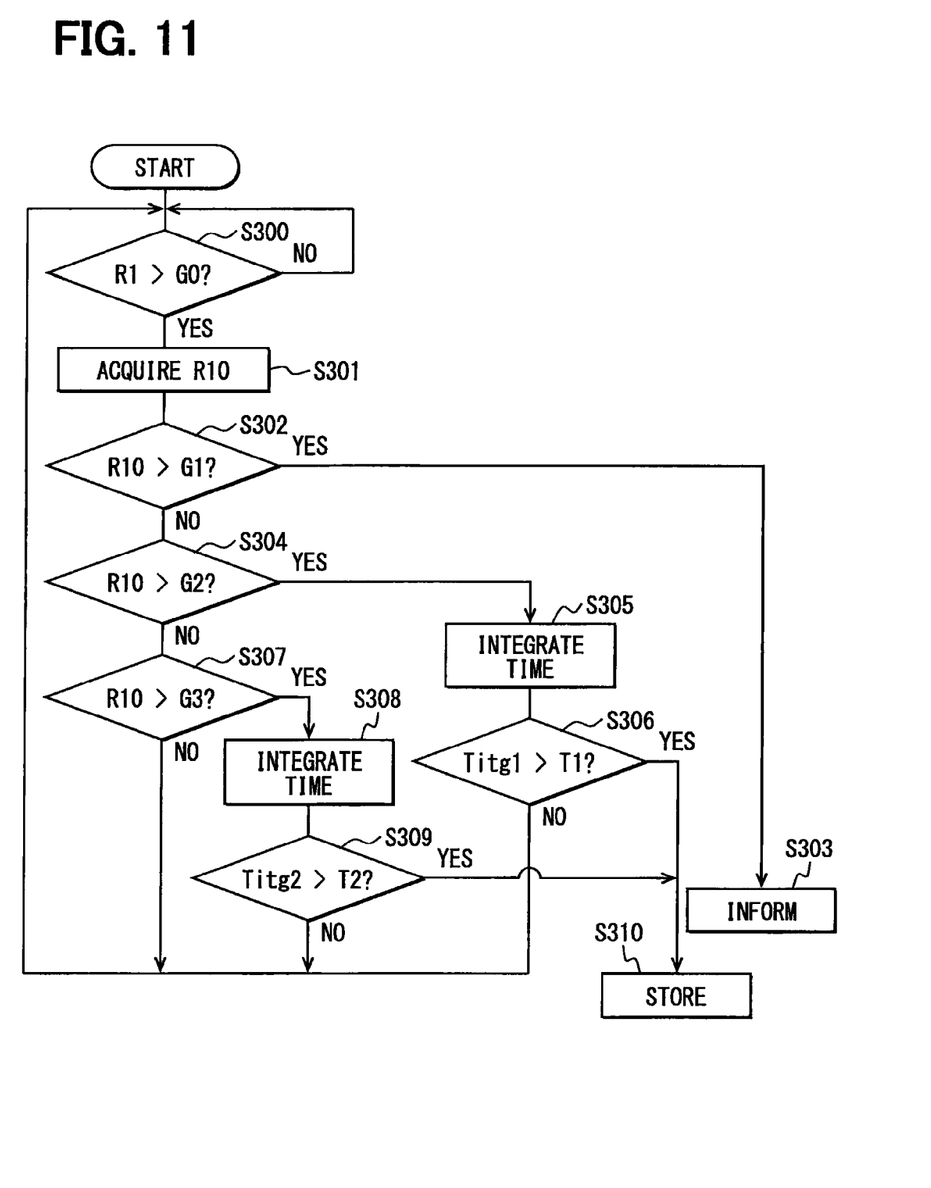
FIG. 11 is a flowchart illustrating an operation of the impact detecting device according to the third embodiment.

Next, an operation of the impact detecting device of the third embodiment will be described with reference to FIG. 10 and FIG. 11. S300 to S309 are the same as S100 to S109 of the impact detecting device 1 of the first embodiment shown in FIG. 2, and thus the descriptions thereof will be made when needed. S310, which is different from the impact detecting device 1 of the first embodiment, will be hereinafter described.

When the determination circuit 34 determines that the integrated time Titg1 that a detection result R10 of the acceleration sensor 30 exceeds the acceleration determination threshold G2 is greater than the integrated time determination threshold T1 (S306: YES), the determination circuit 34 outputs the integrated time Titg1 to the storage circuit 36, and the storage circuit 36 stores the integrated time Titg1 at S310. When the determination circuit 34 determines that the integrated time Titg2 that the detection results R10 of the acceleration sensor 30 exceeds the acceleration determination threshold G3 is greater than the integrated time determination threshold T2 (S309: YES), the determination circuit 34 outputs the integrated time Titg2 to the storage circuit 36 and the storage circuit 36 stores the integrated time Titg2 at S310.

Next, advantageous effects of the impact detecting device 3 of the third embodiment will be described.

In the third embodiment, the impact detecting device 3 can immediately inform that the power supply unit B3 has received an impact that may cause damage to the power supply unit B3 to the user. Therefore, it is possible to reduce a situation where the user does not recognize that the power supply unit B3 has received the impact, which may cause damage, until a periodic inspection. Namely, when the power supply unit B3 has received the impact that may cause damage to the power supply unit B3, the user can immediately know it.

Even if an impact applied to the power supply unit B3 is equal to or smaller than the acceleration determination threshold G1, the power supply unit B3 may be damaged if being subjected to such an impact repeatedly. Also, there may be a case where it is not necessary to immediately inform that an impact has been applied to the power supply unit B3, and is enough to inform it at the time of a periodic inspection.

In the third embodiment, the determination circuit 34 instructs the storage circuit 36 to store the integrated time Titg1, when the detection result R10 of the acceleration sensor 30 is equal to or lower than the acceleration determination threshold G1 and the integrated time Titg1 that the detection result R10 exceeds the acceleration determination threshold G2 being smaller than the acceleration determination threshold G1 is greater than the integrated time determination threshold T1. Therefore, the impact detecting device 3 can properly inform that the power supply unit B3 has received such an impact at the time of the periodic inspection.

Even if an impact applied to the power supply unit B3 is equal to or smaller than the acceleration determination threshold G2, the power supply unit B3 may be damaged if being subjected to such an impact repeatedly. Also, there may be a case that it is not necessary to immediately inform that the power supply unit B3 has received an impact, and is enough to inform it at the time of the periodic inspection.

In the third embodiment, the determination circuit 34 instructs the storage circuit 36 to store the integrated time Titg2, when the detection result R10 of the acceleration sensor 30 is equal to or smaller than the acceleration determination threshold G2 and the integrated time Titg2 that the detection result R10 exceeds the acceleration determination threshold G3 being smaller than the acceleration determination threshold G2 is greater than the integrated time determination threshold T2. Therefore, the impact detecting device 3 can inform that the power supply unit B3 has received such an impact at the time of the periodic inspection.

When the detection result of the acceleration sensor 30 is overlapped with noise, the determination circuit 34 may make erroneous determination, or output erroneous information. In the third embodiment, the impact detecting device 3 includes the acceleration sensors 31, 32 that detect an impact applied to the vehicle. When the detection result R1 of the acceleration sensors 31, 32 are not greater than the acceleration determination threshold G0 which is smaller than the acceleration determination threshold G3, the determination circuit 34 does not perform determination of the detection result R10 of the acceleration sensor 30, and does not instruct the storage circuit 36 to store the information. In other words, when the detection result R1 of the acceleration sensors 31, 32 are greater than the acceleration determination threshold G0 which is smaller than the acceleration determination threshold G3, the determination circuit 34 performs determination of the detection result R10 of the acceleration sensor 30, and instructs the storage circuit 36 to store the information. Therefore, the erroneous determination and the storing of the erroneous information due to the overlapping of the noise can be reduced.

Fourth Embodiment

An impact detecting device of the fourth embodiment will be described.

The impact detecting device of the fourth embodiment has substantially the same structure as the impact detecting device 3 of the third embodiment, but performs determination based on the number of times that the detection result exceeds the acceleration determination threshold, similar to the impact detecting device of the second embodiment. Since the impact detecting device of the fourth embodiment has the same structure as the impact detecting device 3 of the third embodiment, and thus the description thereof will not be repeated.

Figure 12:
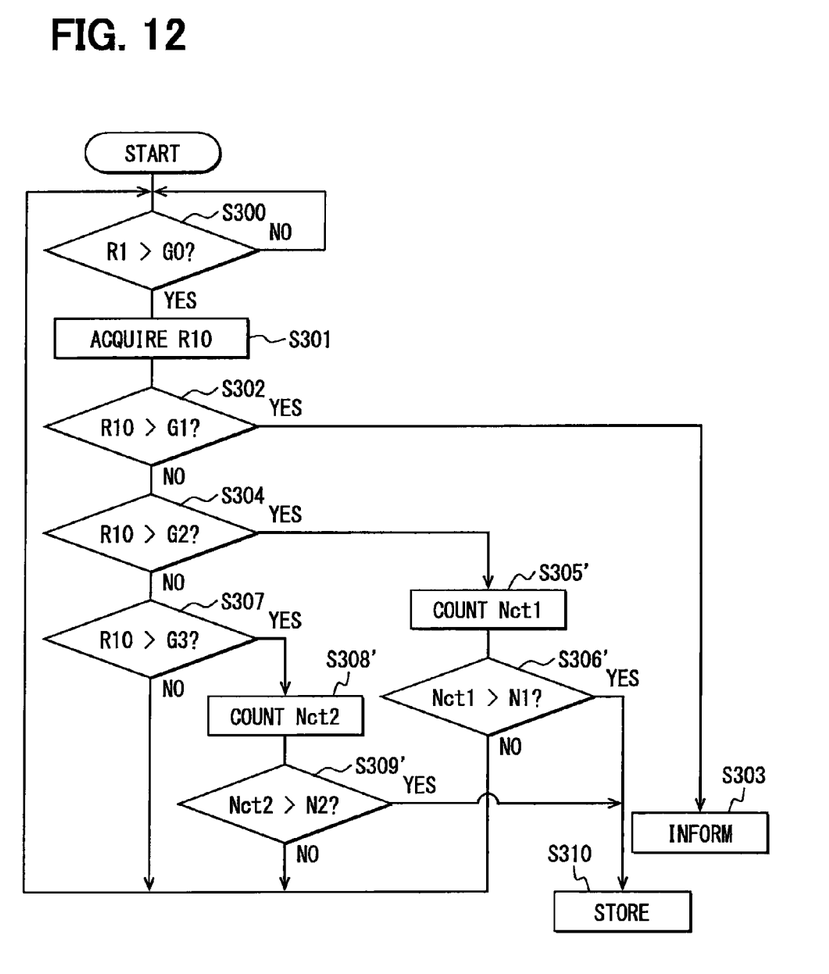
FIG. 12 is a flowchart illustrating an operation of an impact detecting device according to a fourth embodiment of the present disclosure.

An operation of the impact detecting device of the fourth embodiment will be described with reference to FIG. 10 and FIG. 12. S300 to S304 and S307 of FIG. 12 are similar to those of the impact detecting device 3 of the third embodiment shown in FIG. 11, and thus the description thereof will be made when needed. S305', S306', S308' and S309', which are different from the impact detecting device 3 of the third embodiment, will be mainly described.

When the determination circuit 34 determines that the detection result R10 of the acceleration sensor 30 is greater than the acceleration determination threshold G2 (S304: YES), the determination circuit 34 counts up the number of times Nct1 that the detection result R10 exceeds the acceleration determination threshold G2 at S305'. The determination circuit 34 determines whether the number of times Nct1 is greater than the number determination threshold N1 (first number determination threshold) at S306'. In this case, the number determination threshold N1 is set to a level (number of times) at which the power supply unit B3 may be damaged if being applied with an acceleration exceeding the acceleration determination threshold G2 repeatedly.

When the determination circuit 34 determines that the number of times Nct1 is greater than the number determination threshold N1 (S306': YES), the determination circuit 34 outputs the number of times Nct1 to the storage circuit 36, and the storage circuit 36 stores the number of times Nct1 outputted from the determination circuit 34 at S310.

When the determination circuit 34 determines that the detection result R10 of the acceleration sensor 30 is greater than the acceleration determination threshold G3 (S307: YES), the determination circuit 34 counts up the number of times Nct2 that the detection result R10 exceeds the acceleration determination threshold G3 at S308'. The determination circuit 34 determines whether the number of times Nct2 that the detection result R10 exceeds the acceleration determination threshold G3 is greater than the number determination threshold N2 (second number determination threshold) at S309'. In this case, the number determination threshold N2 is set to a level (number of times) that is greater than the number determination threshold N1 and at which the power supply unit B3 may be damaged if being subjected to an acceleration exceeding the acceleration determination threshold G3 repeatedly.

When the determination circuit 34 determines that the number of times Nct2 is greater than the number determination threshold N2 (S309': YES), the determination circuit 34 outputs the number of times Nct2 to the storage circuit 36, and the storage circuit 36 stores the number of times Nct2 outputted from the determination circuit 34 at S310.

When the determination circuit 34 determines that the number of times Nct1 is not greater than the number determination threshold N1 (S306': NO), the determination circuit 34 returns to S300. When the determination circuit 34 determines that the number of times Nct2 is not greater than the number determination threshold N2 (S309': NO), the determination circuit 34 returns to S300. When the determination circuit 34 determines that the detection result R10 of the acceleration sensor 30 is not greater than the acceleration determination threshold G3 (S307: NO), the determination circuit 34 returns to S300.

Next, advantageous effects of the impact detecting device according to the fourth embodiment will be described.

Even if an impact applied to the power supply unit B3 is equal to or smaller than the acceleration determination threshold G1, the power supply unit B3 may be damaged when being applied with such an impact repeatedly. On the other hand, there may be a case that it is not necessary to immediately inform that the power supply unit B3 has received such an impact, and is enough to inform it at the time of periodic inspection. In the fourth embodiment, the determination circuit 34 instructs the storage circuit 36 to store the number of times Nct1, when the detection result R10 of the acceleration sensor 30 is equal to or smaller than acceleration determination threshold G1 and the number of times Nct1 is greater than the number determination threshold N1. Therefore, the impact detecting device can properly inform that such a situation has occurred at the time of the periodic inspection.

Even if an impact applied to the power supply unit B3 is equal to or smaller than the acceleration determination threshold G2, the power supply unit B3 may be damaged if being applied with such an impact repeatedly. On the other hand, there may be a case that it is not necessary to immediately inform such a state, and is enough to inform the state at the time of the periodic inspection. In the fourth embodiment, the determination circuit 34 instructs the storage circuit 36 to store the number of times Nct2, when the detection result R10 of the acceleration sensor 30 is equal to or smaller than the acceleration determination threshold G2 and the number of times Nct2 is greater than the number determination threshold N2, which is greater than the number determination threshold N1. Therefore, the impact detecting device can properly inform that such a situation has occurred at the time of the periodic inspection.

In the first to fourth embodiments, the display units 15, 35 are employed as informing devices for informing that the power supply unit B1, B3 has received an impact. However, the informing device is not limited to the display units 15, 35. The informing device may be provided by a device that informs that the power supply unit B1, B3 has received an impact to the user by sound.

In the first to fourth embodiments, the determination circuits 14, 34 do not perform determination of whether the power supply units B1, B3 have received an impact, when the detection results R1 of the acceleration sensors 11, 12, 31, 32 are not greater than the acceleration determination threshold G0. However, the operation may not be limited to these examples. In the case where arrangement positions and/or detecting directions of the acceleration sensors 11, 12, 31, 32 are different, an acceleration determination threshold may be set separately for each of the acceleration sensors 11, 12, 31, 32.

In the first and second embodiments, the acceleration sensors 10-12 output the analog signals according to the detection results, and the A/D converter 13 converts the analog signals into digital data. However, such a configuration may be modified. For example, the acceleration sensors 10-12 may transmit digital signals according to the detection results, and an interface circuit may receive the digital signals and convert the digital signals into digital data, similar to the third and fourth embodiments.

The embodiments described above may be combined in various ways. For example, the first embodiment and the second embodiment may be suitably combined. In the first embodiment, for example, the determination circuit 14 may perform S105' and S106' of the second embodiment, in place of S105 and S106. In the second embodiment, for example, the determination circuit 14 may perform S105 and S106 of the first embodiment, in place of the S105' and S106'. For example, the third embodiment and the fourth embodiment may be suitably combined. In the third embodiment, for example, the determination circuit 14 may perform S305' and S306' of the fourth embodiment, in place of S305 and S306. In the fourth embodiment, for example, the determination circuit 14 may perform S305 and S306 of the third embodiment, in place of the S305' and S306'.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. An impact detecting device comprising:
  a first impact detecting portion detecting an impact applied to an object equipped to a vehicle;
  a determining portion determining that the object has received the impact when a detection result of the first impact detecting portion is greater than a first impact determination threshold;
  an informing portion informing that the object has received the impact, when the determining portion determines that the object has received the impact; and
  a second impact detecting portion detecting an impact applied to the vehicle, wherein
  the determining portion determines that the object has received the impact, when the detection result of the first impact detecting portion is equal to or smaller than the first impact determination threshold and when a first integrated time that the detection result of the first impact detecting portion exceeds a second impact determination threshold is greater than a first integrated time determination threshold, the second impact determination threshold being smaller than the first impact determination threshold;
  the determining portion determines that the object has received the impact, when the detection result of the first impact detecting portion is equal to or smaller than the second impact determination threshold and when a second integrated time that the detection result of the first impact detecting portion exceeds a third impact determination threshold is greater than a second integrated time determination threshold, the third impact determination threshold being smaller than the second impact determination threshold, and the second integrated time determination threshold being greater than the first integrated time determination threshold; and
  the determining portion determines whether the detection result of the first impact detecting portion is greater than the first impact determination threshold, when a detection result of the second impact detecting portion is greater than a fourth impact determination threshold that is smaller than the third impact determination threshold.

2. The impact detecting device according to claim 1, wherein
  the second impact detecting portion is provided by an impact detecting sensor of an occupant protection control unit, and
  the determining portion is provided by a control portion of the occupant protection control unit, the control portion controlling an operation of an occupant protection device of the vehicle based on a detection result of the impact detecting sensor.

3. An impact detecting device comprising:
  a first impact detecting portion detecting an impact applied to an object equipped to a vehicle;
  a determining portion determining that the object has received the impact when a detection result of the first impact detecting portion is greater than a first impact determination threshold;
  an informing portion informing that the object has received the impact, when the determining portion determines that the object has received the impact; and
  a second impact detecting portion detecting an impact applied to the vehicle, wherein
  the determining portion determines that the object has received the impact, when the detection result of the first impact detecting portion is equal to or smaller than the first impact determination threshold and when a number of times that the detection result of the first impact detecting portion exceeds a second impact determination threshold is greater than a first number determination threshold, the second impact determination threshold being smaller than the first impact determination threshold;
  the determining portion determines that the object has received the impact, when the detection result of the first impact detecting portion is equal to or smaller than the second impact determination threshold and when a number of times that the detection result of the first impact detecting portion exceeds a third impact determination threshold is greater than a second number determination threshold, the third impact determination threshold being smaller than the second impact determination threshold, and the second number determination threshold being greater than the first number determination threshold; and
  the determining portion determines whether the detection result of the first impact detecting portion is greater than the first impact determination threshold, when a detection result of the second impact detecting portion is greater than a fourth impact determination threshold that is smaller than the third impact determination threshold.

4. An impact detecting device comprising:
  a first impact detecting portion detecting an impact applied to an object equipped to a vehicle;
  a determining portion determining that the object has received the impact when a detection result of the first impact detecting portion is greater than a first impact determination threshold;
  an informing portion informing that the object has received the impact, when the determining portion determines that the object has received the impact; and
  a storing portion storing information, wherein
  when the detection result of the first impact detecting portion is equal to or smaller than the first impact determination threshold and when a first integrated time that the detection result of the first impact detecting portion exceeds a second impact determination threshold is greater than a first integrated time determination threshold, the determining portion instructs the storing portion to store the first integrated time as the information, wherein the second impact determination threshold is smaller than the first impact determination threshold.

5. The impact detecting device according to claim 4, wherein
  when the detection result of the first impact detecting portion is equal to or smaller than the second impact determination threshold and when a second integrated time that the detection result of the first impact detecting portion exceeds a third impact determination threshold is greater than a second integrated time determination threshold, the determining portion instructs the storing portion to store the second integrated time as the information, wherein the third impact determination threshold is smaller than the second impact determination threshold, and the second integrated time determination threshold is greater than the first integrated time determination threshold.

6. The impact detecting device according to claim 5, further comprising:
a second impact detecting portion detecting an impact applied to the vehicle, wherein
the determining portion determines whether the detection result of the first impact detecting portion is greater than the first impact determination threshold, when a detection result of the second impact detecting portion is greater than a fourth impact determination threshold that is smaller than the third impact determination threshold.

7. An impact detecting device comprising:
a first impact detecting portion detecting an impact applied to an object equipped to a vehicle;
a determining portion determining that the object has received the impact when a detection result of the first impact detecting portion is greater than a first impact determination threshold;
an informing portion informing that the object has received the impact, when the determining portion determines that the object has received the impact; and
a storing portion storing information, wherein
when the detection result of the first impact detecting portion is equal to or smaller than the first impact determination threshold and when a number of times that the detection result of the first impact detecting portion exceeds a second determination threshold is greater than a first number determination threshold, the determining portion instructs the storing portion to store the number of times that the detection result of the first impact detecting portion exceeds the second determination threshold as the information, wherein the second impact determination threshold is smaller than the first impact determination threshold.

8. The impact detecting device according to claim 7, wherein
when the detection result of the first impact detecting portion is equal to or smaller than the second impact determination threshold and when a number of times that the detection result of the first impact detecting portion exceeds a third impact determination threshold is greater than a second number determination threshold, the determining portion instructs the storing portion to store the number of times that the detection result of the first impact detecting portion exceeds the third impact determination threshold as the information, wherein the third impact determination threshold is smaller than the second impact determination threshold, and the second number determination threshold is greater than the first number determination threshold.

9. The impact detecting device according to claim 8, further comprising:
a second impact detecting portion detecting an impact applied to the vehicle, wherein
the determining portion determines whether the detection result of the first impact detecting portion is greater than the first impact determination threshold, when a detection result of the second impact detecting portion is greater than a fourth impact determination threshold that is smaller than the third impact determination threshold.

10. An impact detecting device comprising:
a first impact detecting portion detecting an impact applied to an object equipped to a vehicle;
a determining portion determining that the object has received the impact when a detection result of the first impact detecting portion is greater than a first impact determination threshold; and
an informing portion informing that the object has received the impact, when the determining portion determines that the object has received the impact; wherein
the determining portion is provided by a control portion of an occupant protection control unit, the control portion controlling an operation of an occupant protection device of the vehicle based on an impact applied to the vehicle.

* * * * *